United States Patent
Milo et al.

(10) Patent No.: US 10,685,292 B1
(45) Date of Patent: Jun. 16, 2020

(54) SIMILARITY-BASED RETRIEVAL OF SOFTWARE INVESTIGATION LOG SETS FOR ACCELERATED SOFTWARE DEPLOYMENT

(71) Applicant: EMC Corporation, Hopkinton, MA (US)

(72) Inventors: Nimrod Milo, Gedera (IL); Omer Sagi, Mazkeret-Batya (IL); Alon J. Grubshtein, Lehavim (IL); Haim Halbfinger, Raanana (IL); Danny Croitoru, Givatim (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 986 days.

(21) Appl. No.: 15/168,642

(22) Filed: May 31, 2016

(51) Int. Cl.
*G06F 15/18* (2006.01)
*G06N 20/00* (2019.01)
*H04L 29/08* (2006.01)
*G06N 5/02* (2006.01)

(52) U.S. Cl.
CPC .............. *G06N 20/00* (2019.01); *G06N 5/022* (2013.01); *H04L 67/2804* (2013.01); *H04L 67/34* (2013.01)

(58) Field of Classification Search
CPC .............. G06N 20/00; G06N 5/00–027; G06F 8/60–65; G06F 11/36–3696
USPC ................ 706/12; 717/124–135, 168–178
See application file for complete search history.

(56) References Cited

U.S. PATENT DOCUMENTS

| | | | |
|---|---|---|---|
| 5,463,768 A * | 10/1995 | Cuddihy ............. | G06F 11/2205 714/37 |
| 7,765,212 B2 | 7/2010 | Surendran et al. | |
| 7,900,201 B1 * | 3/2011 | Qureshi ............... | G06F 11/079 717/174 |
| 7,912,847 B2 | 3/2011 | Lagad et al. | |
| 8,396,741 B2 | 3/2013 | Kannan et al. | |
| 8,458,115 B2 | 6/2013 | Cai et al. | |

(Continued)

OTHER PUBLICATIONS

Salton et al. "A vector space model for automatic indexing", 1975, Communications of the ACM, vol. 18, Issue 11.*

(Continued)

*Primary Examiner* — Jue Louie
(74) *Attorney, Agent, or Firm* — Ryan, Mason & Lewis, LLP

(57) ABSTRACT

A method in one embodiment comprises extracting features from each of a plurality of software investigation log sets, generating representations for respective ones of the software investigation log sets based at least in part on the corresponding extracted features, and storing the representations in a knowledge base. In conjunction with obtaining at least one additional software investigation log set, the method generates a representation of the additional software investigation log set, identifies one or more of the representations previously stored in the knowledge base that exhibit at least a specified similarity to the representation of the additional software investigation log set in accordance with one or more statistical models, and presents information characterizing the one or more software investigation log sets corresponding to respective ones of the identified one or more representations in a user interface. The method is illustratively implemented in a machine learning system of a processing platform.

20 Claims, 4 Drawing Sheets

(56) References Cited

U.S. PATENT DOCUMENTS

| | | | |
|---|---|---|---|
| 8,645,395 B2 | 2/2014 | Mushtaq et al. | |
| 8,719,302 B2 | 5/2014 | Bailey et al. | |
| 8,738,361 B2 | 5/2014 | Gryc et al. | |
| 2002/0100023 A1* | 7/2002 | Ueki | G06F 11/3476 717/127 |
| 2002/0123987 A1* | 9/2002 | Cox | G06K 9/6282 |
| 2002/0152208 A1* | 10/2002 | Bloedorn | G06F 16/3346 |
| 2003/0088562 A1* | 5/2003 | Dillon | G06F 16/30 |
| 2008/0244325 A1* | 10/2008 | Tyulenev | G06F 11/362 714/38.13 |
| 2009/0043797 A1 | 2/2009 | Dorie et al. | |
| 2011/0136542 A1 | 6/2011 | Sathish | |
| 2013/0097167 A1 | 4/2013 | St. Jacques, Jr. et al. | |
| 2013/0211880 A1 | 8/2013 | Kannan et al. | |
| 2014/0101086 A1 | 4/2014 | Lu et al. | |
| 2014/0129536 A1* | 5/2014 | Anand | G06Q 10/0635 707/706 |
| 2015/0178634 A1* | 6/2015 | Chen | G06Q 10/10 706/12 |
| 2015/0347212 A1* | 12/2015 | Bartley | G06F 11/079 714/37 |
| 2015/0347264 A1* | 12/2015 | Mohammed | G06F 11/3476 714/45 |
| 2016/0104093 A1* | 4/2016 | Fletcher | G06Q 10/06393 705/7.39 |
| 2016/0110238 A1* | 4/2016 | Burugula | G06F 16/9024 714/38.11 |
| 2016/0292065 A1* | 10/2016 | Thangamani | G06F 11/079 |
| 2017/0212756 A1* | 7/2017 | Ryali | G06F 8/77 |
| 2017/0300532 A1* | 10/2017 | Simhon | G06F 17/2705 |

OTHER PUBLICATIONS

J. Chuang et al., "Termite: Visualization Techniques for Assessing Textual Topic Models," Proceedings of the ACM International Working Conference on Advanced Visual Interfaces (AVI), May 2012, pp. 74-77, Capri Island, Naples, Italy.

R. Cohen et al., "Redundancy in Electronic Health Record Corpora: Analysis, Impact on Text Mining Performance and Mitigation Strategies," BMC Bioinformatics, Apr. 2013, pp. 1-15, vol. 14, No. 10.

R. Cohen, "Towards Understanding of Medical Hebrew," Thesis, Ben-Gurion University of the Negev, Nov. 2012, 127 pages.

D.M. Blei et al., "Latent Dirichlet Allocation," Journal of Machine Learning Research, Jan. 2003, pp. 993-1022, vol. 3.

A.K. McCallum, "Mallet: A Machine Learning for Language Toolkit," 2002, 2 pages.

H.M. Wallach et al., "Rethinking LDA: Why Priors Matter," Advances in Neural Information Processing Systems 22: 23rd Annual Conference on Neural Information Processing Systems, Dec. 2009, 9 pages, Vancouver, British Columbia, Canada.

P.F. Brown et al., "Class-Based n-gram Models of Natural Language," Association for Computation Linguistics, 1992, pp. 467-479, vol. 18, No. 4.

S. Banerjee et al., "The Design, Implementation and Use of the Ngram Statistics Package," Proceedings of the 4th International Conference on Computational Linguistics and Intelligent Text Processing (CICLing), 2003, pp. 370-381.

A. Nenkova et al., "The Impact of Frequency on Summarization," Microsoft Research, Tech. Rep. MSR-TR-2005-101, Jan. 2005, 8 pages.

H. Daumé III et al., "Bayesian Query-Focused Summarization," Proceedings of the 21st International Conference on Computational Linguistics and 44th Annual Meeting of the ACL, Jul. 2006, pp. 305-312, Sydney, Australia.

J.M. Conroy et al., "CLASSY Query-Based Multi-Document Summarization," Proceedings of the 2005 Document Understanding Workshop, Oct. 2005, 9 pages.

T. Baumel et al., "Query-Chain Focused Summarization," Proceedings of the 52nd Annual Meeting of the Association for Computational Linguistics, Jun. 2014, pp. 913-922, vol. 1.

G. Erkan et al., "LexRank: Graph-Based Lexical Centrality as Salience in Text Summarization," Journal of Artificial Intelligence Research, Dec. 2004, pp. 457-479, vol. 22.

U.S. Appl. No. 14/501,407 filed in the name of R. Cohen et al. filed Sep. 30, 2014 and entitled "Automated Content Inference System for Unstructured Text Data."

U.S. Appl. No. 14/501,431 filed in the name of R. Cohen et al. filed Sep. 30, 2014 and entitled "Cluster Labeling System for Documents Comprising Unstructured Text Data."

U.S. Appl. No. 14/670,810 filed in the name of R. Cohen et al. filed Mar. 27, 2015 and entitled "Analysis and Visualization Tool with Combined Processing of Structured and Unstructured Service Event Data."

U.S. Appl. No. 14/850,195 filed in the name of R. Cohen et al. filed Sep. 10, 2015 and entitled "Topic Model Based Clustering of Text Data with Machine Learning Utilizing Interface Feedback."

\* cited by examiner

SIMILARITY-BASED RETRIEVAL OF SOFTWARE INVESTIGATION LOG SETS FOR ACCELERATED SOFTWARE DEPLOYMENT

FIELD

The field relates generally to information processing systems, and more particularly to software deployment in information processing systems.

BACKGROUND

In many information processing systems, testing and other types of investigation of new or upgraded software products in conjunction with software deployment relies heavily on inefficient manual activities performed by software technicians. For example, it is common in some systems for individual technicians investigating failures or other issues relating to new or upgraded software products to separately characterize their respective investigations using key words of their choosing. Such an approach is not only inefficient, but it is highly subjective. For example, important relations between issues investigated by different technicians may not become apparent if the technicians choose different key words to describe their respective investigations. Conventional practices of this type can therefore unduly delay the process of deploying new or upgraded software in numerous contexts.

SUMMARY

Illustrative embodiments of the present invention provide machine learning systems for automated similarity-based retrieval of software investigation log sets. Such machine learning systems are advantageously configured in some embodiments to facilitate investigation of issues arising in conjunction with deployment of new or upgraded software, thereby substantially accelerating the software deployment process.

In one embodiment, an apparatus comprises a processing platform configured to implement a machine learning system for automated similarity-based retrieval of software investigation log sets. The machine learning system comprises a log set preprocessor configured to extract features from each of the software investigation log sets and to generate representations for respective ones of the software investigation log sets based at least in part on the corresponding extracted features, a knowledge base configured to store the representations, a similarity-based log set retrieval module comprising one or more statistical models each characterizing at least a portion of the knowledge base, and a visualization module comprising at least one view generator. In conjunction with obtaining at least one additional software investigation log set, the machine learning system is configured to generate a representation of the additional software investigation log set using the log set preprocessor, and to identify one or more of the representations previously stored in the knowledge base that are determined by the similarity-based log set retrieval module to exhibit at least a specified similarity to the representation of the additional software investigation log set in accordance with at least one of the one or more statistical models. Information characterizing the one or more software investigation log sets corresponding to respective ones of the identified one or more representations is presented in a user interface under control of the view generator of the visualization module.

In another embodiment, a method comprises extracting features from each of a plurality of software investigation log sets, generating representations for respective ones of the software investigation log sets based at least in part on the corresponding extracted features, and storing the representations in a knowledge base. In conjunction with obtaining at least one additional software investigation log set, the method generates a representation of the additional software investigation log set, identifies one or more of the representations previously stored in the knowledge base that exhibit at least a specified similarity to the representation of the additional software investigation log set in accordance with one or more statistical models, and presents information characterizing the one or more software investigation log sets corresponding to respective ones of the identified one or more representations in a user interface. The method is illustratively implemented in a machine learning system of a processing platform.

By way of example, a given one of the representations in some embodiments comprises a vector representation having entries corresponding to respective ones of the extracted features. Additionally or alternatively, the given representation may be augmented utilizing metadata obtained from a software tracking system.

Some embodiments are further configured to determine a root cause for the at least one additional software investigation log set based at least in part on root cause information associated with respective ones of the one or more of the representations previously stored in the knowledge base that exhibit at least the specified similarity to the representation of the additional software investigation log set. The root cause information illustratively comprises metadata obtained from a software tracking system.

Illustrative embodiments can provide a number of significant advantages relative to the conventional arrangements described previously. For example, one or more of these embodiments avoid the need for inefficient and subjective manual processing of software investigation log sets by software technicians. Instead, the machine learning systems in some embodiments are data driven in that relations between distinct software investigation log sets are identified automatically from the actual log set data itself. Such arrangements lead to accelerated software deployment and associated reductions in cost and complexity.

These and other illustrative embodiments described herein include, without limitation, apparatus, systems, methods and computer program products comprising processor-readable storage media.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
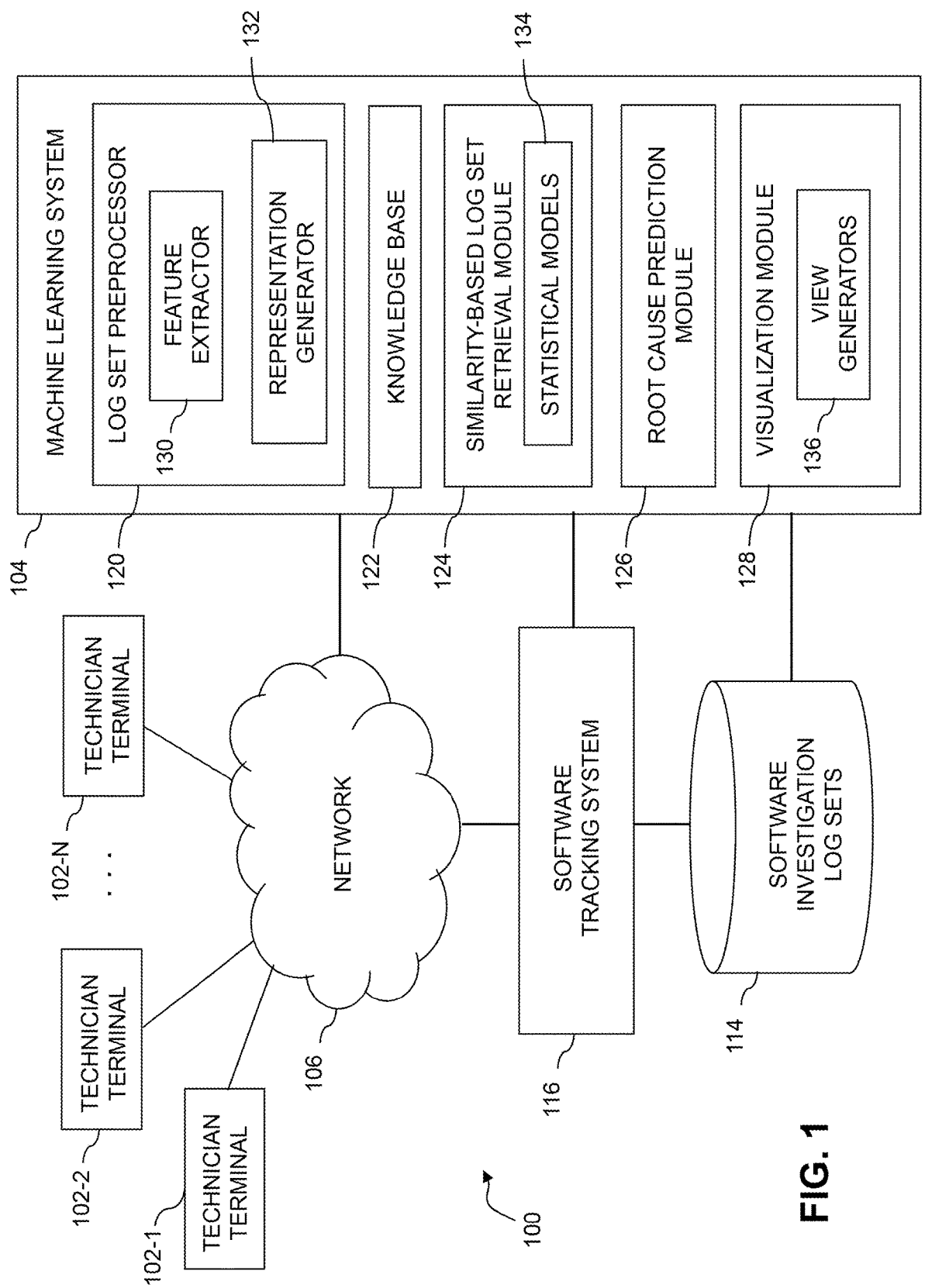
FIG. 1 is a block diagram of an information processing system that includes a machine learning system for automated similarity-based retrieval of software investigation log sets in an illustrative embodiment of the invention.

FIG. 1 shows an information processing system 100 configured in accordance with an illustrative embodiment of the present invention. The information processing system 100 is assumed to be built on at least one processing platform and in this embodiment illustratively comprises a plurality of technician terminals 102-1, 102-2, . . . 102-N and a machine learning system 104, all of which are coupled to and communicate over a network 106. The machine learning system 104 is advantageously configured for automated similarity-based retrieval of software investigation log sets. The software investigation log sets illustratively comprise information characterizing respective investigations of deployed software as carried out by one or more software technicians associated with technician terminals 102. These software technicians illustratively comprise developers, analysts, subject matter experts or other system users that are involved in investigations of deployed software.

The machine learning system 104 is coupled to a software investigation log sets database 114. The log sets database 114 in the present embodiment is assumed to comprise software investigation log sets generated by a software tracking system 116, although other types of software investigation log sets can be used in other embodiments. The term "software investigation log set" as used herein is intended to be broadly construed so as to encompass, for example, logs of events associated with investigation of defects, bugs, failures or other issues arising in conjunction with software deployment. A given such software investigation log set in an illustrative embodiment may be viewed as comprising a "dossier" of information characterizing a software investigation conducted by a software technician or other type of system user within the system 100.

It is to be appreciated that the log sets database 114 may comprise a combination of multiple separate databases, such as separate databases for storing log sets for different types of software products. Such multiple databases may be co-located within a given data center or other facility or geographically distributed over multiple distinct facilities. Numerous other combinations of multiple databases can be used in implementing at least portions of the log sets database 114. For example, a given information processing system in another embodiment can include multiple software tracking systems, each having its own database of software investigation log sets.

The log sets database 114 illustratively comprises one or more storage disks, storage arrays, electronic memories or other types of memory, in any combination. Although shown as separate from the machine learning system 104 in FIG. 1, the log sets database 114 in other embodiments can be at least partially incorporated within the machine learning system 104, or within one or more other system components.

The log sets stored in the log sets database 114 need not be in any particular format or formats, but generally comprise data logs characterizing investigations undertaken by one or more technicians relating to issues arising in software deployment. Such deployment illustratively comprises deployment of new or upgraded software. For example, upgraded software may comprise a revision to a previously-deployed software product.

In the present embodiment, the machine learning system 104 and the log sets database 114 are both assumed to be associated with the software tracking system 116. For example, the storage of logs sets in and the retrieval of logs sets from the log sets database 114 in this embodiment can be controlled at least in part by the associated software tracking system 116. The machine learning system 104 can communicate directly with the log sets database 114 and the software tracking system 116, and additionally or alternatively can communicate with these and other system components via the network 106.

It is assumed in the present embodiment that the software tracking system 116 coordinates storage of software investigation log sets in the log sets database 114, as well as provisioning of portions of those log sets to the machine learning system 104 as needed for processing. It is also possible for the machine learning system 104 to provide data directly to, and retrieve data directly from, the log sets database 114. Examples of conventional software tracking systems that may be adapted for use in illustrative embodiments of the present invention include JIRA, Gitlab and Bugzilla.

At least portions of the data provided for storage in the log sets database 114 can come from one or more of the technician terminals 102 via the software tracking system 116. Also, visualizations or other related output information can be delivered by the machine learning system 104 to one or more of the technician terminals 102 over network 106. Thus, for example, a visualization or other type of machine learning system output can be provided to an application running on a desktop computer, tablet computer, laptop computer, mobile telephone or other type of technician terminal.

The machine learning system 104 in the present embodiment is separated into a plurality of functional modules, illustratively including a log set preprocessor 120, a knowledge base 122, a similarity-based log set retrieval module 124, a root cause prediction module 126 and a visualization module 128.

The log set preprocessor 120 is configured to extract features from each of a plurality of software investigation log sets and to generate representations for respective ones of the software investigation log sets based at least in part on the corresponding extracted features. These functions are illustratively provided by a feature extractor 130 and a representation generator 132, respectively.

It is assumed that at least a subset of the software investigation log sets processed by the log set preprocessor 120 are generated by the software tracking system 116, although the machine learning system 104 can obtain log sets in other ways in one or more alternative embodiments of the invention. Also, it should be noted that in some embodiments, at least a portion of the machine learning system 104 may be implemented within the software tracking system 116, or vice-versa. The machine learning system 104 and the software tracking system 116 therefore need not be entirely separate elements as illustrated in the FIG. 1 embodiment.

In some embodiments, at least a given one of the software investigation log sets comprises serial log instances relating to at least one test performed on a particular piece of software. Such tests may be performed by the software tracking system 116 under the control of a software technician associated with one of the technician terminals 102. As another example, a given one of the software investigation log sets may comprise a set of log files relating to a plurality of different events involving a particular piece of software. The events can be from different parts of a system in which the software product is deployed, such as from different nodes in a cluster-based system. It is also possible that a given log set can comprise a set of log files obtained from "call home" log data submitted to the system 100 by a given customer of the software product at issue. Accordingly, it should be apparent that a wide variety of different types of log sets can be used in illustrative embodiments.

The log set preprocessor 120 in the present embodiment is assumed to generate the representation of a given one of the software investigation log sets as a vector representation having entries corresponding to respective ones of the extracted features. Accordingly, particular features extracted by the feature extractor 130 are inserted into corresponding entry positions in a vector representation generated by the representation generator 132. The resulting representation may be viewed as providing a "fingerprint" for the corresponding log set.

The machine learning system 104 is advantageously data driven in that representations are generated automatically utilizing features extracted from the software investigation log sets themselves using the log set preprocessor 120. Such an arrangement allows similarities to other log sets to be determined in a particularly accurate and efficient manner.

The log set preprocessor 120 in generating the representation of a given one of the software investigation log sets is illustratively further configured to augment the representation utilizing metadata obtained from the software tracking system 116. Such metadata in some embodiments comprises root cause information of the corresponding log set.

Although the log set preprocessor 120 in the FIG. 1 embodiment is shown as being implemented within the machine learning system 104, in other embodiments the log set preprocessor 120 can be implemented at least in part externally to the machine learning system 104. For example, log set preprocessor 120 can be implemented in a related system, such as the software tracking system 116.

The knowledge base 122 is configured to store the log set representations generated by the log set preprocessor 120. The knowledge base 122 in some embodiments is implemented using an electronic memory or other high-speed memory of the machine learning system 104 or an associated processing platform.

The similarity-based log set retrieval module 124 is configured to implement one or more statistical models 134 each characterizing at least a portion of the knowledge base 122. Such statistical models 134 illustratively characterize the behavior of the log sets associated with particular software products under investigation within the system 100. The statistical models 134 are utilized by the similarity-based log set retrieval module 124 to identify, for a given additional log set obtained by the machine learning system 104, one or more previously processed log sets that exhibit behavior similar to that of the given additional log set. The additional log set may be submitted via the software tracking system 116 by a system user such as a technician associated with one of the technician terminals 102.

By way of example, in conjunction with obtaining at least one additional software investigation log set, the machine learning system 104 is configured to generate a representation of the additional software investigation log set using the log set preprocessor 120, and to identify one or more of the representations previously stored in the knowledge base 122 that are determined by the similarity-based log set retrieval module 124 to exhibit at least a specified similarity to the representation of the additional software investigation log set in accordance with at least one of the one or more statistical models 134.

In some embodiments, the similarity-based log set retrieval module 124 utilizes a k-nearest neighbors ("KNN") algorithm in order to determine the one or more of the representations previously stored in the knowledge base 122 that exhibit at least the specified similarity to the representation of the additional software investigation log set. Other types of unsupervised or supervised machine learning statistical models can be used alone or in combination in other embodiments.

The term "similarity-based log set retrieval" as used herein is intended to be broadly construed so as to encompass retrieval of log set representations from the knowledge base 122, and additionally or alternatively retrieval of the actual log sets from the log sets database 114 or other storage system.

The machine learning system 104 in the present embodiment further comprises a root cause prediction module 126. This module is illustratively configured to determine a root cause for the at least one additional software investigation log set based at least in part on root cause information associated with respective ones of the one or more of the representations previously stored in the knowledge base 122 that exhibit at least the specified similarity to the representation of the additional software investigation log set. For example, the root cause prediction module 126 can estimate a root cause for the additional software investigation log set as an average or other function of root cause values that were previously specified for the other log sets determined to be sufficiently similar to the additional log set.

The machine learning system 104 stores the representation of the additional software investigation log set in the knowledge base 122 for use in processing other software investigation log sets subsequently obtained by the machine learning system 104. As the knowledge base 122 in the present embodiment stores representations rather than the actual log sets, it can operate quickly on any submitted log sets by comparing representations of those log sets to previously stored representations of other log sets. The actual log sets corresponding to a given identified representation can be retrieved by the machine learning system 104 as needed and provided to one or more of the technician terminals 102 over the network 106, possibly via the software tracking system 116.

The one or more statistical models 134 are illustratively updated by the similarity-based log set retrieval module 124 responsive to its determination of the one or more representations previously stored in the knowledge base 122 that exhibit at least the specified similarity to the representation of the additional software investigation log set.

The visualization module 128 comprises one or more view generators 136. Information characterizing the one or more software investigation log sets corresponding to respective ones of the identified one or more representations is presented in a user interface under control of the one or more view generators 136 of the visualization module 128.

In some embodiments, the machine learning system 104 is configured to receive user feedback regarding at least one of the identified one or more representations via the user interface and to adjust at least one of the one or more statistical models 134 responsive to the received user feedback. For example, the similarity-based log set retrieval module 124 in some embodiments is configured to receive feedback from one of the software technicians or another system user regarding similarity of the one or more identified representations or their respective log sets and the additional log set.

Visualizations generated by the one or more view generators 136 of the visualization module 128 are presented to a system user possibly in conjunction with the one or more user interface displays. For example, a given one of the view generators 136 can be configured to generate a similarity-based retrieved representations view comprising a visualization of representations of multiple log sets identified as similar to a representation of a given additional log set. Such a visualization illustratively includes multiple distinct icons or other links that when actuated allow the user to retrieve the respective actual log sets corresponding to the identified representations. A wide variety of additional or alternative view generators 136 can be used in the visualization module 128 in other embodiments.

In some embodiments, the visualization module 128 is part of a software deployment analysis and visualization tool. Such a tool can incorporate other parts of the machine learning system 104. For example, it is possible to implement the machine learning system 104 within an analysis and visualization tool. The analysis and visualization tool can include a web-based user interface as its front end. An analytics database and associated processing logic can form a backend of the tool.

Although the visualization module 128 in the FIG. 1 embodiment is shown as being implemented within the machine learning system 104, in other embodiments this component, like the log set preprocessor 120 as previously indicated, can be implemented at least in part externally to the machine learning system 104, such as in the software tracking system 116 associated with the log sets database 114, or elsewhere in the system 100.

An output display generated by visualization module 128 utilizing the one or more view generators 136 is illustratively presented on a display screen of one or more of the technician terminals 102 of system 100. As indicated previously, such a terminal may comprise a computer, mobile telephone or other type of processing device adapted for communication with the machine learning system 104 over the network 106.

The visualization module 128 in some embodiments operates in cooperation with the similarity-based log set retrieval module 124 to support tuning functionality in the machine learning system 104 using the above-noted user interface displays. However, such tuning functionality need not be provided in other embodiments. For example, some embodiments can operate utilizing unsupervised machine learning functionality.

It is to be appreciated that the particular arrangement of system components illustrated in FIG. 1 is exemplary only, and that numerous other arrangements of components may be used in other embodiments. For example, in other embodiments, similarity-based log set retrieval functionality described herein as being associated with one or more of the log set preprocessor 120, knowledge base 122, similarity-based log set retrieval module 124, root cause prediction module 126 and visualization module 128 may be implemented at least in part using additional or alternative components of the system 100.

The machine learning system 104, and possibly other related components of system 100 such as the log sets database 114, are assumed in the present embodiment to be implemented on a given processing platform using at least one processing device comprising a processor coupled to a memory. Examples of such processing platforms will be described in greater detail below in conjunction with FIGS. 3 and 4.

The one or more processing devices implementing the machine learning system 104, and possibly other components of system 100, may each further include a network interface that allows such components to communicate with one another over network 106. For example, a given such network interface illustratively comprises network interface circuitry that allows at least one of the modules 120, 122, 124, 126 and 128 to communicate over network 106 with other components of the system 100 such as technician terminals 102, the log sets database 114 and software tracking system 116. Such network interface circuitry may comprise, for example, one or more conventional transceivers.

The network 106 may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

As a more particular example, some embodiments may implement at least a portion of the network 106 utilizing one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

At least a portion of the machine learning system 104, and possibly other system components, may comprise software that is stored in a memory and executed by a processor of at least one processing device.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of FIG. 2, which illustrates an exemplary process carried out by the system 100 in one embodiment. The process as shown includes steps 200 through 210. Steps 200 through 210 are assumed to be performed by the machine learning system 104, but one or more of these steps may be performed at least in part by or in conjunction with other system components in other embodiments. Moreover, functionality for similarity-based retrieval of software investigation log sets as disclosed herein should not be viewed as being limited in any way to this particular illustrative arrangement of process steps. As indicated above, similarity-based retrieval of log sets is assumed to encompass similarity-based retrieval of corresponding log set representations from the knowledge base 122, as well as numerous other similarity-based retrieval arrangements.

In step 200, features are extracted from each of a plurality of software investigation log sets. For example, the software investigation log sets are illustratively obtained by the machine learning system 104 accessing the log sets database 114. The feature extractor 130 of the log set preprocessor 120 is then utilized to extract features from each of the obtained software investigation log sets. It is to be appreciated, however, that numerous other techniques may be used to obtain software investigation log sets for feature extraction in other embodiments. For example, the machine learning system 104 can obtain at least a portion of the software investigation log sets directly from the software tracking system 116 as those log sets are generated within system 100.

In step 202, representations are generated for respective ones of the software investigation log sets based at least in part on the corresponding extracted features. This operation is illustratively performed by the representation generator 132 of the log set preprocessor 120. The representations in some embodiments are generated as respective vector representations having entries corresponding to respective ones of the extracted features. Additionally or alternatively, one or more of the representations is augmented utilizing metadata obtained from the software tracking system 116. Such metadata may comprise root cause information or other types of information characterizing at least portions of the corresponding software investigation log set. As indicated previously, numerous other types and formats are possible for log set representations in illustrative embodiments.

Multiple software investigation log sets can be processed as a batch in steps 200 and 202. Alternatively, different instances of steps 200 and 202 can be applied serially to each of a plurality of such log sets. Accordingly, illustrative embodiments can support batch or serial processing modes, as well as other types of processing modes for handling multiple software investigation log sets. One or more of the software investigation log sets processed in steps 200 and 202 may comprise training log sets selected as being representative of at least a portion of a history of a particular piece of software as reflected by the software tracking system 116. In other implementations of the process, the process can be initiated using only a single software investigation log set, rather than multiple software investigation log sets as illustrated in the present embodiment.

In step 204, the generated representations are stored in a knowledge base. For example, the representations may be stored in knowledge base 122 as they are generated by the representation generator 132. The knowledge base 122 is illustratively a database accessible to the machine learning system 104. For example, in some embodiments, the knowledge base 122 is implemented as a MongoDB database. The term "knowledge base" as used herein is intended to be broadly construed so as to encompass one or more databases or other storage arrangements comprising multiple representations each derived from at least a portion of one or more software investigation log sets.

In step 206, an additional software investigation log set is obtained and a representation of the additional log set is generated. One or more of the representations stored in the knowledge base that exhibit at least a specified similarity to the representation of the additional log set are then identified.

In step 208, information characterizing the log sets corresponding to the identified representations is presented in a user interface. For example, the identified representations or related information characterizing those representations can be presented in a sorted order of degree of similarity to the additional log set.

Some embodiments can perform one or more additional or alternative processing operations in conjunction with identification of representations similar to the additional representation. For example, a root cause may be estimated or otherwise determined for the at least one additional software investigation log set based at least in part on root cause information associated with respective ones of the one or more of the representations previously stored in the knowledge base that exhibit at least the specified similarity to the representation of the additional software investigation log set. Such a root cause determination may be presented in the user interface in association with the information characterizing the log sets corresponding to the identified representations.

In step 210, the additional representation is stored in the knowledge base and one or more statistical models utilized in the similarity-based retrieval are updated.

Figure 2:
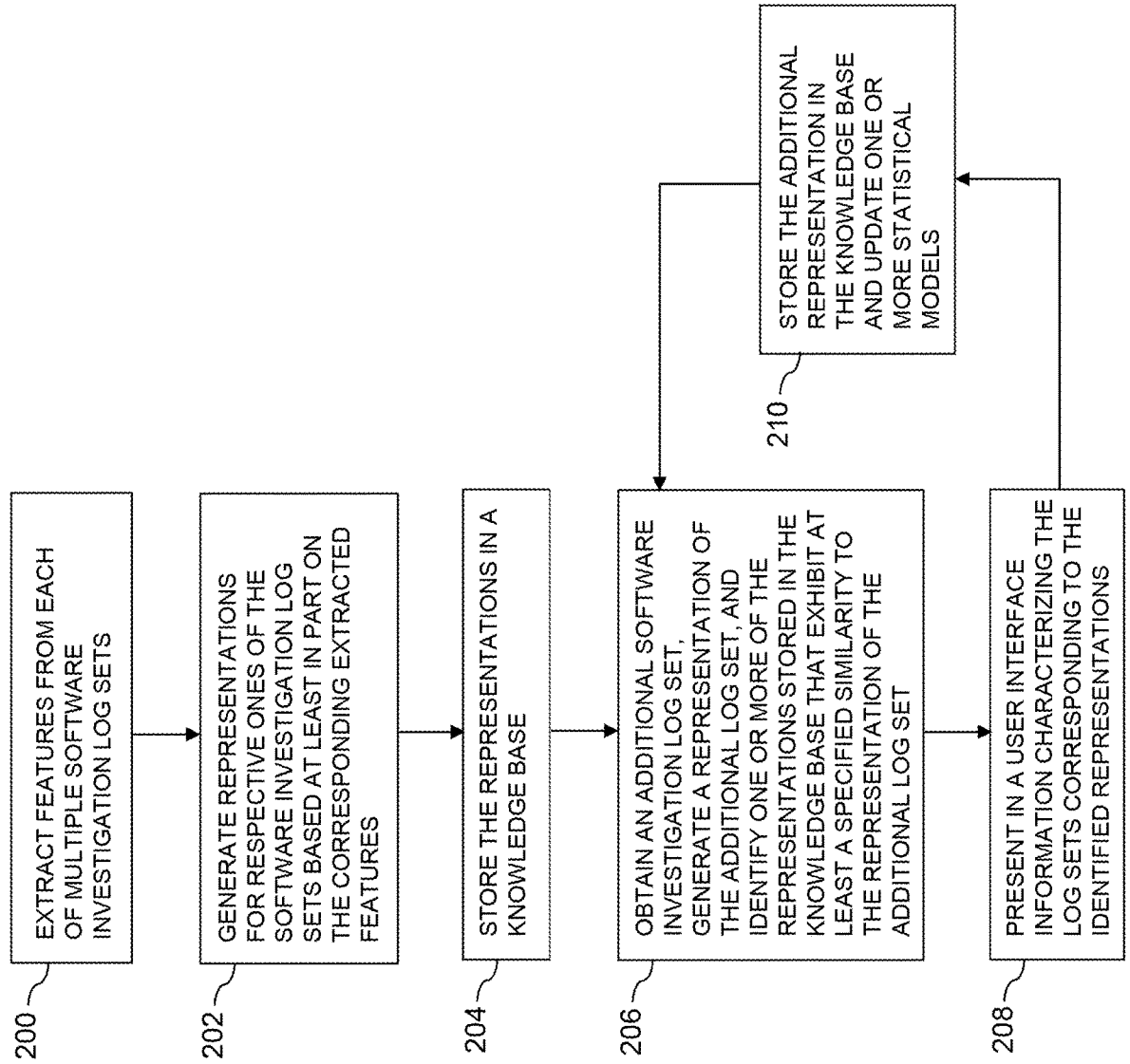
FIG. 2 is a flow diagram of an exemplary process implemented in the information processing system of FIG. 1.

Although the FIG. 2 process is illustrated for the case of processing a single additional software investigation log set in steps 206, 208 and 210, these steps can be applied substantially simultaneously to multiple additional software investigation log sets.

The above-noted user interface is illustratively configured to permit a user to provide feedback regarding the one or more identified representations. For example, in some embodiments, the machine learning system 104 is further configured to receive user feedback regarding at least one of the identified one or more representations via the user interface and to adjust at least one of the one or more statistical models responsive to the received user feedback. A user interface configured to receive user feedback of this type is also referred to herein as a tuning interface. The user feedback can include a confidence level for each of the one or more identified representations with the confidence level for a given one of the identified representations indicating how similar the user believes the given identified representation is to a submitted additional software investigation log set. These and other types of feedback provided via a user interface are illustratively provided by one or more developers, analysts, subject matter experts or other system users.

The machine learning system 104 in some embodiments utilizes such feedback to update the one or more statistical models for automated classification of software investigation log set representations in conjunction with similarity-based retrieval. A relatively small amount of such feedback can lead to significant enhancements in the accuracy and efficiency of the automated classification process. Illustrative embodiments can thus facilitate unsupervised classification with minimal analyst intervention via the user interface to achieve significantly higher levels of performance.

Various types of user interfaces comprising functionality for provision of user feedback can be configured under the control of the view generators 136 of the visualization module 128 of the machine learning system 104. For example, one possible user interface can present links to the one or more software investigation log sets corresponding to the respective one or more identified representations. Actuation of a given such link causes additional information relating to the selected software investigation log set to be retrieved and presented via the user interface. A control button or other selection mechanism can be provided to allow the user to provide a confidence level or other type of feedback for each of the identified representations or their respective corresponding log sets. For example, the confidence level in some embodiments is binary in that the user can select only "similar" or "not similar" although other arrangements of multiple selectable confidence levels can be used in other embodiments.

Numerous other types of user interfaces can be used in other embodiments. Such user interfaces are assumed to utilize one or more visualizations generated by view generators 136 of the visualization module 128. Such visualizations can include graphs or other displays, as well as drop-down menus, activatable icons or other control buttons configured to facilitate user navigation through the identified one or more representations or the corresponding software investigation log sets.

Steps 200 through 210 of the FIG. 2 process can be repeated periodically or as needed to process additional software investigation log sets. The process illustratively provides a user with an accurate and efficient automated mechanism for identifying and accessing software investigation log sets that are sufficiently similar to a given additional software investigation log set possibly submitted by the user.

Implementations of the FIG. 2 process can be utilized in a wide variety of different software investigation contexts. For example, assume that a software technician is conducting a quality assurance (QA) investigation based on overnight testing of the latest version of a software product. Further assume that the testing utilized 10 distinct test jobs, and that 5 of the test jobs failed. Under conventional practice, the software technician would typically have to manually investigate the log sets corresponding to the failed test jobs in order to identify a particular defect, bug or other issue that may have led to the multiple failures. Moreover, it would be very difficult to ascertain relationships between these failed test jobs and numerous other failed test jobs possibly submitted by other software technicians. Automated similarity-based retrieval utilizing machine learning as disclosed herein can be used to accurately and efficiently identify similarities between the various failure mechanisms across a potentially very large number of log sets involving a given software product.

As another example, similarity-based retrieval of log sets in other embodiments can be used to assist a customer with resolving issues that arise in conjunction with deployment of a software product within an enterprise. In such an arrangement, the customer can log into a dedicated website and upload one or more log sets reflecting its usage of the software product. The system can automatically provide the customer with a set of similar issues encountered for this product as well as instructions for resolving those issues. Accordingly, some embodiments can be configured to provide a self-service automated analysis and visualization tool for customer "call home" log data.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing similarity-based retrieval of software investigation log sets in a machine learning system. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing a machine learning system as disclosed herein.

The illustrative embodiments provide a number of significant advantages relative to conventional arrangements.

For example, one or more of these embodiments avoid the need for inefficient and subjective manual processing of software investigation log sets by software technicians. Instead, the machine learning systems in some embodiments are data driven in that relations between distinct software investigation log sets are identified automatically from the actual log set data itself, illustratively utilizing behavioral patterns reflected in extracted features. Such arrangements facilitate investigation of issues arising in conjunction with deployment of new or upgraded software, leading to accelerated software deployment and associated reductions in cost and complexity.

Some embodiments provide a proactive approach that builds a data-driven knowledge base of log set representations so as to facilitate automated issue detection and resolution in conjunction with software deployment. Such an approach significantly shortens the software investigation process as it automatically identifies existing similar issues. For example, a given embodiment can receive a particular log set as its input and can return a list of existing issues that share sufficiently similar log pattern behavior.

One or more of the illustrative embodiments not only result in reduced software investigation time, but also avoid subjectively biased investigations while providing more reliable software tracking based on highly accurate representations reflecting the actual state of the software product as deployed in the field.

These and other embodiments can avoid situations in which, for example, different software technicians utilize different terminology or naming conventions to describe similar issues. Also, problems arising from poor data quality such as misspellings or ambiguities in the log sets are avoided by the similarity-based retrieval functionality implemented in illustrative embodiments herein. Moreover, there is no need to formulate a query in the particular language of a given software tracking system, such as the JQL query language required by the JIRA software tracking system.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 3:
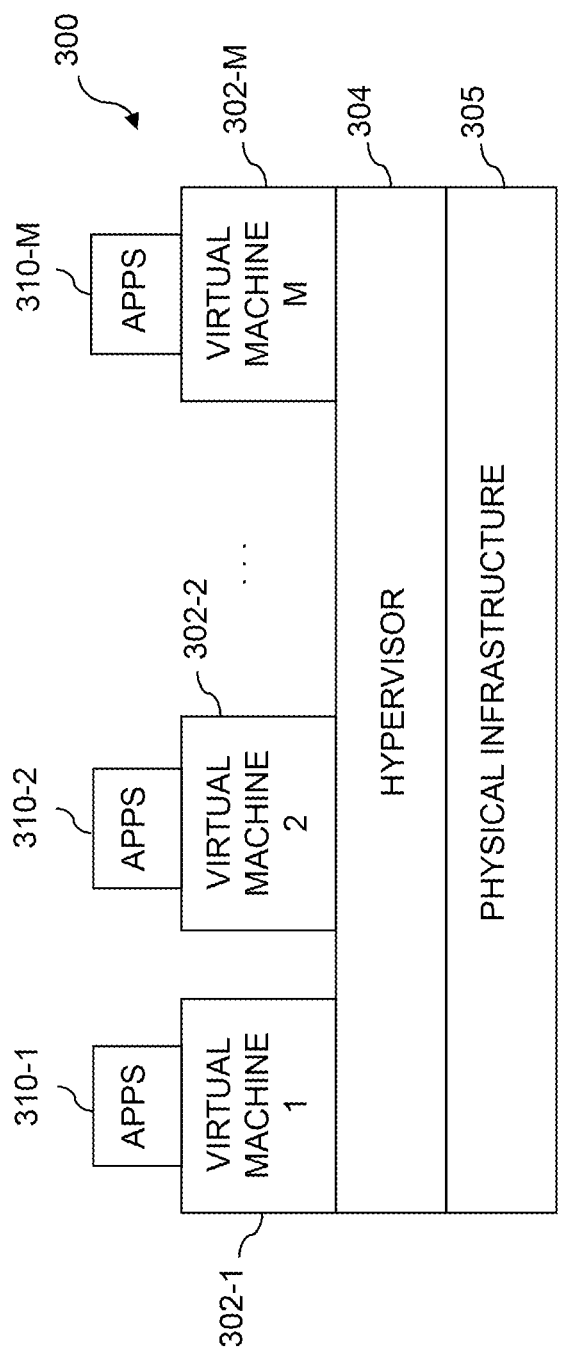
FIGS. 3 and 4 show examples of processing platforms that may be utilized to implement at least a portion of the information processing system of FIG. 1.
Figure 4:
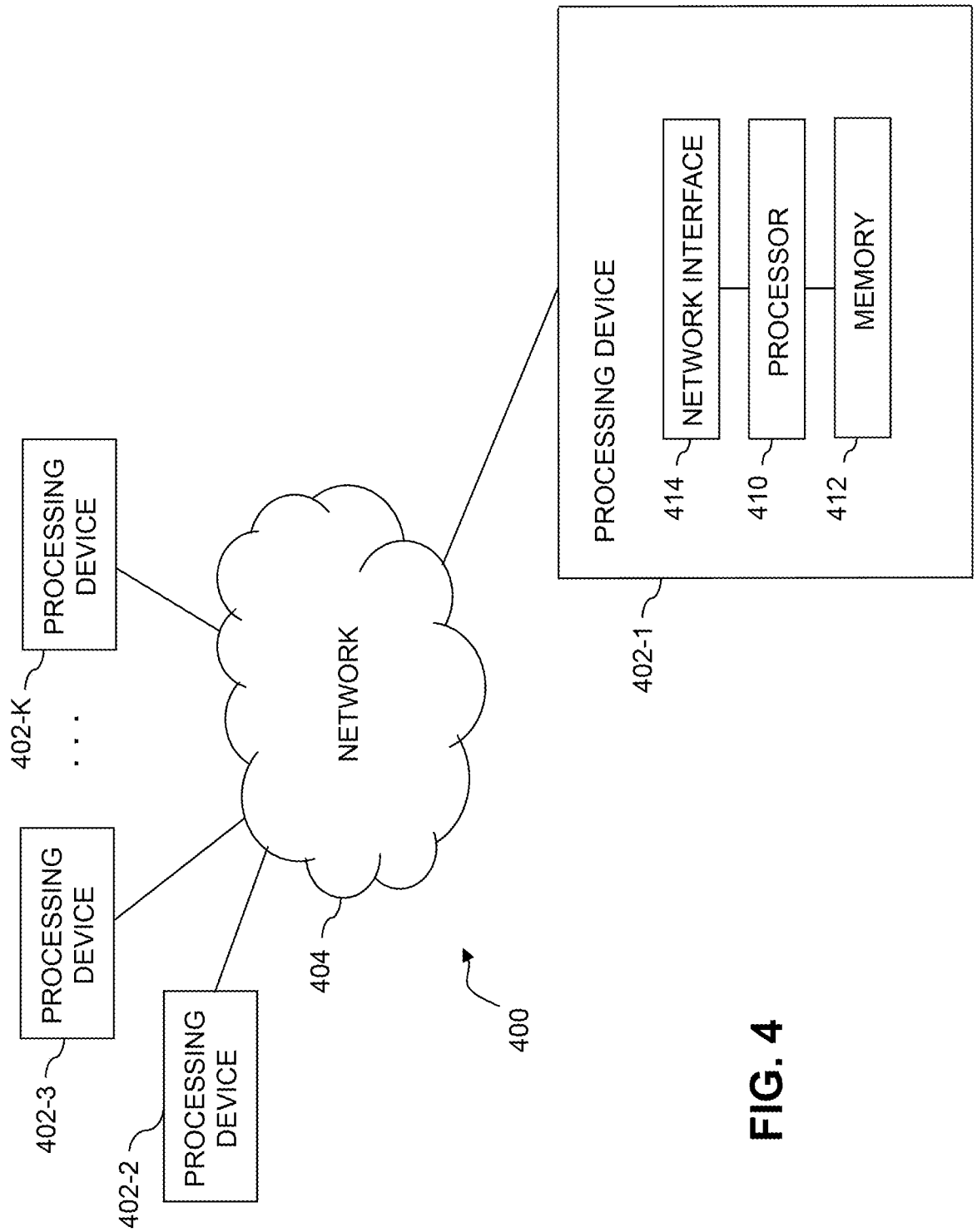

FIG. 3 shows an example processing platform comprising cloud infrastructure 300. The cloud infrastructure 300 comprises a combination of physical and virtual processing resources that may be utilized to implement at least a portion of the information processing system 100. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine.

Different sets of virtual machines provided by one or more hypervisors may be utilized in configuring multiple instances of various components of the system 100.

An example of a commercially available hypervisor platform that may be used to implement hypervisor 304 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As indicated previously, the network 404 in some embodiments may more particularly comprise one or more high-speed local networks in which associated processing devices communicate with one another utilizing PCIe cards of those devices. Additionally or alternatively, networking protocols such as InfiniBand, Gigabit Ethernet or Fibre Channel can be utilized in network 404.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA) or other type of processing circuitry, as well as portions or combinations of such circuitry elements.

The memory 412 may comprise random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. More particularly, a machine learning system and possibly other system components of the type disclosed herein can be implemented using converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, machine learning systems, databases, software tracking systems and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform configured to implement a machine learning system for automated similarity-based retrieval of software investigation log sets;
wherein the machine learning system comprises:
a log set preprocessor configured to extract features from each of the software investigation log sets and to generate representations for respective ones of the software investigation log sets based at least in part on the corresponding extracted features;
a knowledge base configured to store the representations;
a similarity-based log set retrieval module comprising one or more statistical models each characterizing at least a portion of the knowledge base; and
a visualization module comprising at least one view generator;
a given one of the software investigation log sets characterizing multiple events relating to a particular piece of software and being generated by a software tracking system that is configured to track activities associated with deployment within at least one enterprise of multiple distinct pieces of software including the particular piece of software;
the software tracking system being further configured to provide metadata that is incorporated into the representations of the respective software investigation log sets;
wherein the log set preprocessor generates the representation of the given one of the software investigation log sets as a vector representation having entries corresponding to respective ones of the extracted features;
wherein the log set preprocessor in generating the representation of the given one of the software investigation log sets is further configured to augment the representation utilizing at least a portion of the metadata obtained from the software tracking system;
said at least a portion of the metadata obtained from the software tracking system and utilized to augment the given representation comprising root cause information characterizing the given software investigation log set;
wherein in conjunction with obtaining at least one additional software investigation log set, the machine learning system is configured to generate a representation of the additional software investigation log set using the log set preprocessor, and to identify one or more of the representations previously stored in the knowledge base that are determined by the similarity-based log set retrieval module to exhibit at least a specified similarity to the representation of the additional software investigation log set in accordance with at least one of the one or more statistical models;
wherein information characterizing the one or more software investigation log sets corresponding to respective ones of the identified one or more representations is presented in a user interface under control of the view generator of the visualization module; and
wherein the processing platform comprises one or more processing devices each comprising a processor coupled to a memory.

2. The apparatus of claim 1 wherein each of the software investigation log sets is generated by the software tracking system.

3. The apparatus of claim 1 wherein at least a portion of the machine learning system is implemented within the software tracking system.

4. The apparatus of claim 1 wherein the given one of the software investigation log sets comprises serial log instances relating to at least one test performed on the particular piece of software.

5. The apparatus of claim 1 wherein the given one of the software investigation log sets comprises a set of log files relating to a plurality of different events involving the particular piece of software.

6. The apparatus of claim 1 wherein the similarity-based log set retrieval module utilizes a k-nearest neighbors algorithm in order to determine the one or more of the representations previously stored in the knowledge base that exhibit at least the specified similarity to the representation of the additional software investigation log set.

7. The apparatus of claim 1 wherein the machine learning system further comprises a root cause prediction module that is configured to determine a root cause for the at least one additional software investigation log set based at least in part on root cause information associated with respective ones of the one or more of the representations previously stored in the knowledge base that exhibit at least the specified similarity to the representation of the additional software investigation log set.

8. The apparatus of claim 1 wherein the machine learning system is further configured to store the representation of the additional software investigation log set in the knowledge base for use in processing other software investigation log sets subsequently obtained by the machine learning system.

9. The apparatus of claim 1 wherein the one or more statistical models are updated responsive to the determination of the one or more of the representations previously stored in the knowledge base that exhibit at least the specified similarity to the representation of the additional software investigation log set.

10. The apparatus of claim 1 wherein the machine learning system is further configured to receive user feedback regarding at least one of the identified one or more representations via the user interface and to adjust at least one of the one or more statistical models responsive to the received user feedback.

11. An information processing system comprising the apparatus of claim 1.

12. A method comprising:
extracting features from each of a plurality of software investigation log sets;
generating representations for respective ones of the software investigation log sets based at least in part on the corresponding extracted features;
storing the representations in a knowledge base;
a given one of the software investigation log sets characterizing multiple events relating to a particular piece of software and being generated by a software tracking system that is configured to track activities associated with deployment within at least one enterprise of multiple distinct pieces of software including the particular piece of software;

the software tracking system being further configured to provide metadata that is incorporated into the representations of the respective software investigation log sets;

wherein generating a given one of the representations further comprises generating the given representation as a vector representation having entries corresponding to respective ones of the extracted features;

wherein generating the given one of the representations further comprises augmenting the given representation utilizing at least a portion of the metadata obtained from the software tracking system;

said at least a portion of the metadata obtained from the software tracking system and utilized to augment the given representation comprising root cause information characterizing the given software investigation log set;

in conjunction with obtaining at least one additional software investigation log set, generating a representation of the additional software investigation log set, and identifying one or more of the representations previously stored in the knowledge base that exhibit at least a specified similarity to the representation of the additional software investigation log set in accordance with one or more statistical models; and presenting information characterizing the one or more software investigation log sets corresponding to respective ones of the identified one or more representations in a user interface;

wherein the method is implemented by a processing platform comprising one or more processing devices.

13. The method of claim 12 further comprising determining a root cause for the at least one additional software investigation log set based at least in part on root cause information associated with respective ones of the one or more of the representations previously stored in the knowledge base that exhibit at least the specified similarity to the representation of the additional software investigation log set.

14. A computer program product comprising a non-transitory processor-readable storage medium having program code of one or more software programs embodied therein, wherein the program code when executed by at least one processing device of a processing platform causes the processing device:

to extract features from each of a plurality of software investigation log sets;

to generate representations for respective ones of the software investigation log sets based at least in part on the corresponding extracted features;

to store the representations in a knowledge base;

a given one of the software investigation log sets characterizing multiple events relating to a particular piece of software and being generated by a software tracking system that is configured to track activities associated with deployment within at least one enterprise of multiple distinct pieces of software including the particular piece of software;

the software tracking system being further configured to provide metadata that is incorporated into the representations of the respective software investigation log sets;

wherein generating a given one of the representations further comprises generating the given representation as a vector representation having entries corresponding to respective ones of the extracted features;

wherein generating the given one of the representations further comprises augmenting the given representation utilizing at least a portion of the metadata obtained from the software tracking system;

said at least a portion of the metadata obtained from the software tracking system and utilized to augment the given representation comprising root cause information characterizing the given software investigation log set;

in conjunction with obtaining at least one additional software investigation log set, to generate a representation of the additional software investigation log set, and to identify one or more of the representations previously stored in the knowledge base that exhibit at least a specified similarity to the representation of the additional software investigation log set in accordance with one or more statistical models; and to present information characterizing the one or more software investigation log sets corresponding to respective ones of the identified one or more representations in a user interface.

15. The computer program product of claim 14 wherein the program code when executed by said at least one processing device further causes the processing device to determine a root cause for the at least one additional software investigation log set based at least in part on root cause information associated with respective ones of the one or more of the representations previously stored in the knowledge base that exhibit at least the specified similarity to the representation of the additional software investigation log set.

16. The computer program product of claim 14 wherein the program code when executed by said at least one processing device further causes the processing device to store the representation of the additional software investigation log set in the knowledge base for use in processing other subsequently obtained software investigation log sets.

17. The computer program product of claim 14 wherein the program code when executed by said at least one processing device further causes the processing device to update the one or more statistical models responsive to the determination of the one or more of the representations previously stored in the knowledge base that exhibit at least the specified similarity to the representation of the additional software investigation log set.

18. The computer program product of claim 14 wherein the program code when executed by said at least one processing device further causes the processing device to receive user feedback regarding at least one of the identified one or more representations and to adjust at least one of the one or more statistical models responsive to the received user feedback.

19. The computer program product of claim 14 wherein the program code when executed by said at least one processing device further causes the processing device to utilize a k-nearest neighbors algorithm in order to determine the one or more of the representations previously stored in the knowledge base that exhibit at least the specified similarity to the representation of the additional software investigation log set.

20. The computer program product of claim 14 wherein the given one of the software investigation log sets comprises a set of log files relating to a plurality of different events involving the particular piece of software.

* * * * *